US010280732B2

(12) United States Patent
Dursun et al.

(10) Patent No.: US 10,280,732 B2
(45) Date of Patent: May 7, 2019

(54) EMPLOYING A TARGET RISK ATTRIBUTE PREDICTOR WHILE DRILLING

(71) Applicant: LANDMARK GRAPHICS CORPORATION, Houston, TX (US)

(72) Inventors: Serkan Dursun, Stafford, TX (US); Robello Samuel, Cypress, TX (US); Aniket, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 252 days.

(21) Appl. No.: 15/313,502

(22) PCT Filed: Aug. 21, 2014

(86) PCT No.: PCT/US2014/052156
§ 371 (c)(1),
(2) Date: Nov. 22, 2016

(87) PCT Pub. No.: WO2015/191095
PCT Pub. Date: Dec. 17, 2015

(65) Prior Publication Data
US 2017/0191359 A1 Jul. 6, 2017

Related U.S. Application Data

(60) Provisional application No. 62/009,822, filed on Jun. 9, 2014.

(51) Int. Cl.
*E21B 44/06* (2006.01)
*E21B 47/12* (2012.01)
(Continued)

(52) U.S. Cl.
CPC ............... *E21B 44/06* (2013.01); *E21B 7/04* (2013.01); *E21B 21/08* (2013.01); *E21B 44/04* (2013.01);
(Continued)

(58) Field of Classification Search
CPC .. G06F 19/00; G06F 17/3053; G06F 17/5009; G06F 19/24
(Continued)

(56) References Cited

U.S. PATENT DOCUMENTS

| 4,450,354 A | 5/1984 | Smith, Jr. et al. |
| 4,744,030 A | 5/1988 | Carlson et al. |

(Continued)

FOREIGN PATENT DOCUMENTS

| WO | 2012144991 A1 | 10/2012 |
| WO | 2013/126074 | 8/2013 |

(Continued)

OTHER PUBLICATIONS

Abdulrahman Al-Basman Al-Rashidi "Application of Neural Networks to Evaluate Factors Affecting Drilling Performance" Imperial College London Department of Earth Science and Engineering Centre of Petroleum Studies (Year: 2011).*

(Continued)

*Primary Examiner* — Brian S Cook
(74) *Attorney, Agent, or Firm* — Howard L. Speight, PLLC

(57) ABSTRACT

A method including obtaining input attribute values and a target risk attribute value associated with a first borehole segment. The method also includes training a prediction model for the target risk attribute using the input attribute values and the target risk attribute value. The method also includes acquiring subsequent input attribute values. The method also includes using the trained prediction model and the subsequent input attribute values to predict a target risk attribute value for a second borehole segment. The method also includes storing or displaying information based on the predicted target risk attribute value.

20 Claims, 4 Drawing Sheets

(51) Int. Cl.

| | |
|---|---|
| E21B 7/04 | (2006.01) |
| E21B 21/08 | (2006.01) |
| E21B 44/04 | (2006.01) |
| E21B 45/00 | (2006.01) |
| E21B 47/06 | (2012.01) |
| E21B 49/00 | (2006.01) |
| G01V 99/00 | (2009.01) |

(52) U.S. Cl.
CPC .............. *E21B 45/00* (2013.01); *E21B 47/06* (2013.01); *E21B 47/065* (2013.01); *E21B 47/12* (2013.01); *E21B 49/003* (2013.01); *G01V 99/005* (2013.01)

(58) Field of Classification Search
USPC .......................................................... 703/2
See application file for complete search history.

(56) References Cited

U.S. PATENT DOCUMENTS

| | | | |
|---|---|---|---|
| 2002/0103630 | A1 | 8/2002 | Aldred et al. |
| 2003/0168257 | A1 | 9/2003 | Aldred et al. |
| 2004/0256152 | A1* | 12/2004 | Dashevskiy ............ E21B 44/00 175/25 |
| 2005/0071120 | A1 | 3/2005 | Hutchinson |
| 2005/0279532 | A1 | 12/2005 | Ballantyne et al. |
| 2006/0173625 | A1 | 8/2006 | Moran |
| 2006/0193625 | A1 | 8/2006 | Nomura |
| 2008/0188958 | A1 | 8/2008 | Herbst |
| 2008/0314585 | A1 | 12/2008 | Clark |
| 2011/0022554 | A1* | 1/2011 | Reckmann ............ E21B 41/00 706/17 |
| 2011/0174541 | A1 | 7/2011 | Strachan et al. |
| 2011/0247803 | A1 | 10/2011 | Rodney et al. |
| 2013/0036077 | A1 | 2/2013 | Moran et al. |
| 2013/0277115 | A1 | 10/2013 | Paulk |

FOREIGN PATENT DOCUMENTS

| | | |
|---|---|---|
| WO | 2014022614 A1 | 2/2014 |
| WO | 2015/191095 | 12/2015 |
| WO | 2016/057030 | 4/2016 |
| WO | 2016/060684 | 4/2016 |
| WO | 2017083380 A1 | 5/2017 |

OTHER PUBLICATIONS

Lisa A Mondy, "Advanced Wellbore Thermal Simulator GEOTEMP2 User Manual", Sandia Report (Year: 1984).*
Araujo, "Analytical Prediction Model of Sand Production Integrating Geomechanics for Open Hole and Cased—Pe Copyright 2014, Society of Petroleum Engineersrforated Wells." (Year: 2014).*
Huang "A Stratigraphic Modeling Method based on Borehole Data ", College of Defense Engineering, PLA University of Science and Technology IJCSI International Journal of Computer Science Issues, vol. 11, Issue 2, No. 1, Mar. 2014 (Year: 2014).*
PCT International Search Report and Written Opinion, dated Jul. 6, 2015, Appl No. PCT/US2014/059681, "Predicting Temperature-Cycling-Induced Downhole Tool Failure," Filed Oct. 8, 2014, 13 pgs.
PCT International Search Report and Written Opinion, dated Jul. 8, 2015, Appl No. PCT/US2014/061128, "Casing Wear Prediction Using Integrated Physics-Driven and Data-Driven Models," Filed Oct. 17, 2014, 15 pgs.
PCT International Search Report and Written Opinion, dated Feb. 27, 2015, Appl No. PCT/US2014/052156, "Employing a Target Risk Attribute Predictor While Drilling," Filed Aug. 21, 2014, 14 pgs.
Kumar, Aniket, et al., "Analytical Model to Predict the Effect of Pipe Friction on Downhole Fluid Temperatures," SPE Drilling & Completion, Sep. 2013, p. 270-277, Society of Petroleum Engineers, United States.
International Preliminary Examining Authority, International Preliminary Report on Patentability, International Application No. PCT/US14/52156, which is the PCT parent of the instant application, dated Dec. 15, 2016.
Australian Government IP Australia, Examination report No. 1 for standard patent application, Application No. 2014396852, entire document, which is an AU counterpart to the instant application; dated Apr. 18, 2017.
Australian Government IP Australia, Patent Examination Report No. 4, Patent Application No. 2014396852, pp. 1-6, which is an AU counterpart to the instant application, dated Mar. 23, 2018.

* cited by examiner

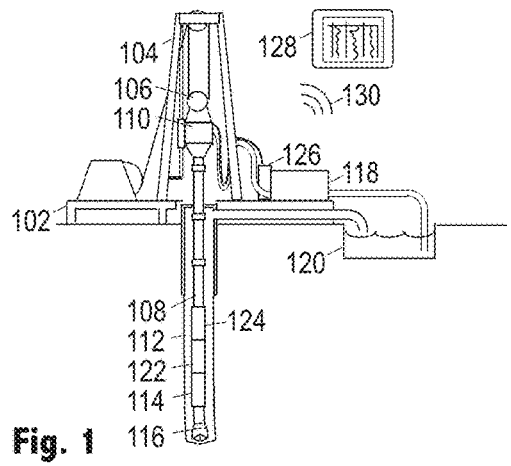
Fig. 1
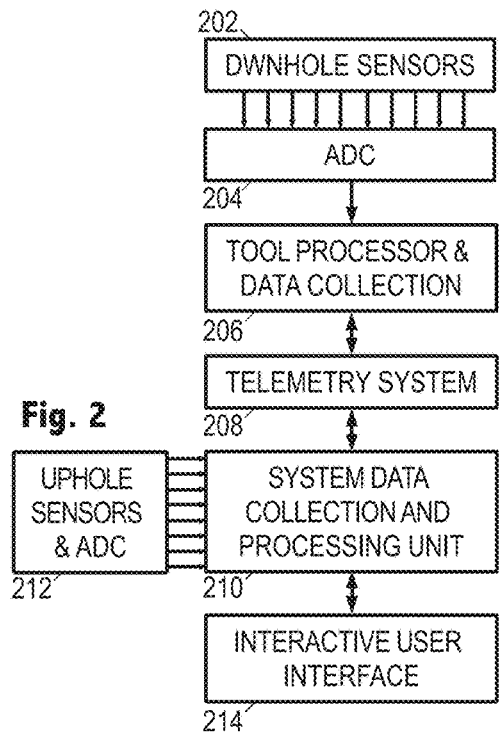
Fig. 2
Fig. 3
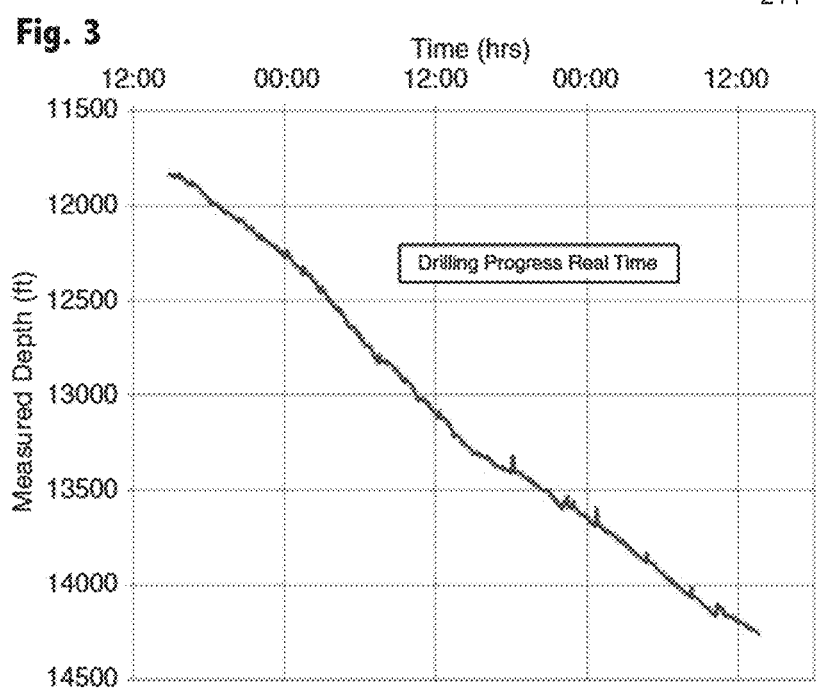

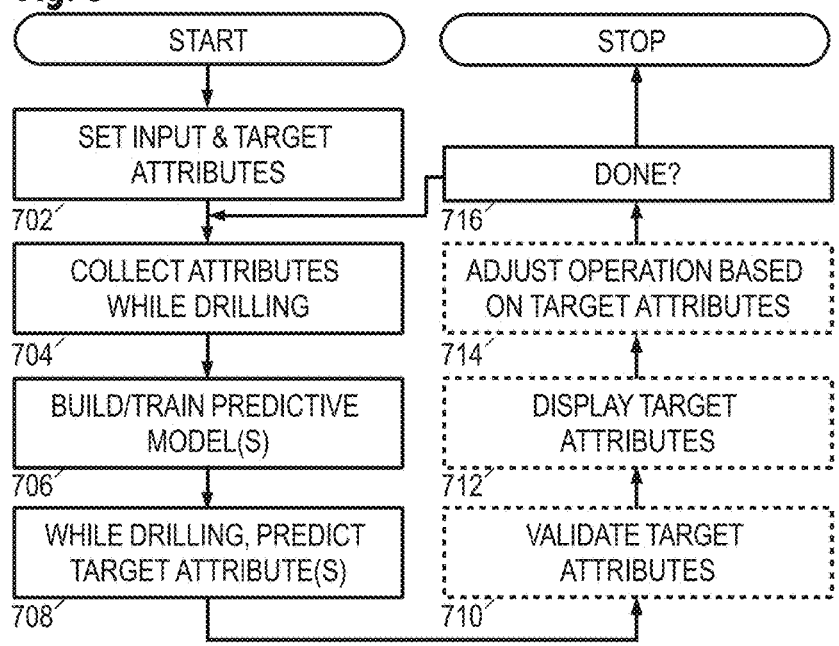

EMPLOYING A TARGET RISK ATTRIBUTE PREDICTOR WHILE DRILLING

CROSS-REFERENCE TO RELATED APPLICATIONS

This application claims priority to U.S. Provisional Application No. 62/009,822, entitled "Data-Driven Model For Predicting Downhole Temperature," filed Jun. 9, 2014, and incorporated herein by reference in its entirety.

BACKGROUND

Oil field operators demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde as it traverses the borehole, collecting measurements as a function of position. The wireline may also provide electrical and/or optical conductors for high bandwidth communications between the sonde and the surface electronics.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations. Most telemetry systems designed for this environment are bandwidth restricted, requiring operators to send only the highest-priority measurements (in compressed form) in "real-time" and store the rest for later retrieval, perhaps when the drilling assembly is recovered from the borehole.

In the competition for bandwidth, common casualties are those tools that generate high measurement data rates (e.g., multi-array resistivity tools, magnetic resonance (MR) logging tools, and acoustic waveform logging tools). To provide measurements in a fashion approaching "real-time", such tools routinely employ significant amounts of downhole processing and compression to condense the raw measurements into a (hopefully) representative bitstream.

More surprising casualties are those sensors that generate low bandwidth measurement streams which are nevertheless get stored (and possibly summarized) rather than being transmitted to the surface in a timely fashion. For example, bandwidth limitations may be sufficiently severe that the engineers omit downhole temperature measurements from the real-time telemetry stream, electing instead to summarize and store such measurements for later retrieval. Intermediate solutions, such as sending a temperature measurement once every hour, are also possible. Despite being driven by necessity, such choices are often considered prudent due to assumptions about the expected behavior of such measurements. Such assumptions may be wrong, often leading to unexpected and "inexplicable" failures of the downhole tools.

BRIEF DESCRIPTION OF THE DRAWINGS

Accordingly, there are disclosed in the drawings and the following description various methods of employing a target risk attribute predictor while drilling. The disclosed methods are intended to impose no additional burden on the telemetry bandwidth of a drilling system and, in some instances, may partly alleviate that burden. In the drawings:

FIG. 1 shows an illustrative logging while drilling (LWD) environment.

FIG. 2 is a block diagram of an illustrative LWD system.

FIG. 3 is a graph showing an illustrative drilling position as a function of time.

FIG. 8 is an illustrative table of attributes.

FIG. 9 is a flow diagram of a second illustrative logging method embodiment.

Figure 4:
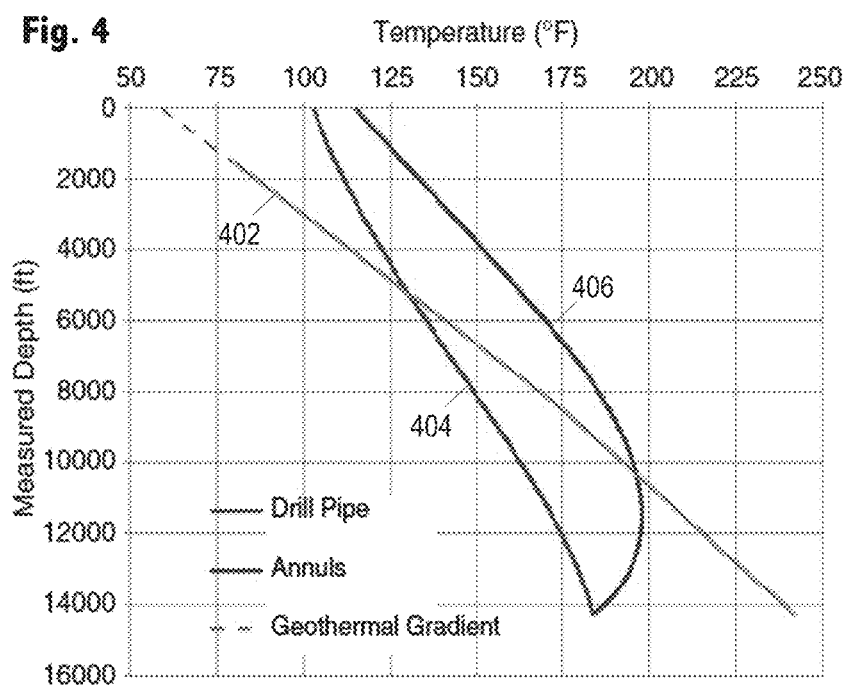
FIG. 4 is a graph showing an illustrative dependence of temperature on position.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are methods employing a target risk attribute predictor while drilling. The target risk attribute(s) (sometimes referred to herein as "target attribute(s)") being predicted may correspond to temperature variation, pore pressure variation, vibration variation, and/or some other attribute that can be correlated with an increased risk of drilling degradation or failure. Additionally or alternatively, the target risk attribute being predicted may be correlated with an increased risk of downhole sensor degradation or failure. The output of the target risk attribute predictor may be stored and/or displayed for use by a drilling operator. As an example, the output of the target risk attribute predictor may be displayed as a log or risk level indicator to guide drilling operations. Further, the output of the target risk attribute predictor may be used to manually or automatically adjust a drilling direction and/or drilling operational parameters (e.g., torque, weight-on-bit, rotation rate) while drilling a borehole.

Various options are available for training the prediction model used for the target risk attribute predictor. In at least some embodiments, the prediction model is trained using sensor-based data obtained from one or more previously drilled boreholes. Additionally or alternatively, the prediction model may be trained using sensor-based data obtained from a previously drilled segment of a borehole that is being drilled. Additionally or alternatively, the prediction model may be trained using sensor-based data obtained from a current segment of a borehole that is being drilled. More specifically, in at least some embodiments, the sensor-based data used to train the prediction model corresponds to available target risk attribute values (e.g., a temperature log, a pore pressure log, or a vibration log) for a previously drilled borehole, a previously drilled segment of a borehole that is being drilled, or a current segment of a borehole that is being drilled. In addition, the sensor-based data used to train the prediction model corresponds to available input attribute values (e.g., drilling mud temperature, weight-on-bit, torque, rate of rotation, rate of penetration) for a previously drilled borehole, a previously drilled segment of a borehole that is being drilled, or a current segment of a borehole that is being drilled. While various examples are provided herein, it should be appreciated that any available input attribute that can be correlated with a target risk attribute can be used to train the prediction model. After the prediction model has been trained, subsequent input attribute values can be used to predict a target risk attribute value, where the predicted target risk attribute value corresponds to a current segment or an ahead-of-bit segment of a borehole being drilled. As more data becomes available, prediction model training can be repeated or updated to improve prediction results.

The disclosed methods and systems are best understood in the context of the larger systems in which they operate. Accordingly, FIG. 1 shows an illustrative logging while drilling (LWD) environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As the drill bit 116 rotates, it extends the borehole 112 through various subsurface formations. The downhole motor assembly 114 may include a rotary steerable system (RSS) that enables the drilling crew to steer the borehole along a desired path. A pump 118 circulates drilling fluid through a feed pipe to the top drive 110, downhole through the interior of drill string 108, through orifices in drill bit 116, back to the surface via the annulus around drill string 108, and into a retention pit 120. The drilling fluid transports cuttings from the borehole into the retention pit 120 and aids in maintaining the borehole integrity.

The drill bit 116 and downhole motor assembly 114 form just one portion of a bottom-hole assembly (BHA) that includes one or more drill collars (i.e., thick-walled steel pipe) to provide weight and rigidity to aid the drilling process. Some of these drill collars include built-in logging instruments to gather measurements of various drilling parameters such as position, orientation, weight-on-bit, torque, vibration, borehole diameter, downhole temperature and pressure, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used.

In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

One or more LWD tools 122 may also be integrated into the BHA for measuring parameters of the formations being drilled through. As the drill bit 116 extends the borehole 112 through the subsurface formations, the LWD tools 122 rotate and collect measurements of such parameters as resistivity, density, porosity, acoustic wave speed, radioactivity, neutron or gamma ray attenuation, magnetic resonance decay rates, and indeed any physical parameter for which a measurement tool exists. A downhole controller associates the measurements with time and tool position and orientation to map the time and space dependence of the measurements. The measurements can be stored in internal memory and/or communicated to the surface. A telemetry sub 124 may be included in the bottom-hole assembly to maintain a communications link with the surface. Mud pulse telemetry is one common telemetry technique for transferring tool measurements to a surface interface 126 and to receive commands from the surface interface, but other telemetry techniques can also be used. Typical telemetry data rates may vary from less than one bit per minute to several bits per second, usually far below the necessary bandwidth to communicate all of the raw measurement data to the surface.

The surface interface 126 is further coupled to various sensors on and around the drilling platform to obtain measurements of drilling parameters from the surface equipment. Example drilling parameters include standpipe pressure and temperature, annular pressure and temperature, a drilling fluid temperature at earth's surface, a downhole drilling fluid temperature, drilling fluid flow rates to and from the hole, drilling fluid density and/or heat capacity, hook load, rotations per minute, torque, deployed length of the drill string 108, and rate of penetration.

A processing unit, shown in FIG. 1 in the form of a tablet computer 128, communicates with surface interface 126 via a wired or wireless network communications link 130 and provides a graphical user interface (GUI) or other form of interactive interface that enables a user to provide commands and to receive (and optionally interact with) a visual representation of the acquired measurements. The measurements may be in log form, e.g., a graph of the measured parameters as a function of time and/or position along the borehole. The processing unit can take alternative forms, including a desktop computer, a laptop computer, an embedded processor, a cloud computer, a central processing center accessible via the internet, and combinations of the foregoing.

In addition to the uphole and downhole drilling parameters and measured formation parameters, the surface interface 126 or processing unit 128 may be further programmed with additional parameters regarding the drilling process, which may be entered manually or retrieved from a configuration file. Such additional parameters may include, for example, the specifications for the drill string tubulars, including wall material and thickness as well as stand lengths; the type of drill bit; the LWD tools; and the configuration of the BHA. The additional information may further include a desired borehole trajectory, an estimated geothermal gradient, typical pause lengths for connection makeups, and logs from standoff wells.

Thus the term "parameter" as used herein is a genus for the various species of parameters: uphole drilling parameters, downhole drilling parameters, formation parameters, and additional parameters. Synonyms include "attribute" and "characteristic", and each parameter has a value that may be set (e.g., a tubular wall material) or that may be measured (e.g., a flow rate), and in either case may or may not be expected to vary, e.g., as a function of time or position.

FIG. 2 is a function-block diagram of an illustrative LWD system. A set of downhole sensors 202, preferably but not necessarily including both drilling parameter sensors and formation parameter sensors, provides signals to a sampling block 204. The sampling block 204 digitizes the sensor signals for a downhole processor 206 that collects and stores the signal samples, either as raw data or as derived values obtained by the processor from the raw data. The derived values may, for example, include representations of the raw data, possibly in the form of statistics (e.g., averages and variances), function coefficients (e.g., the amplitude and speed of an acoustic waveform), the parameters of interest (e.g., the offset distance rather than the travel time, or the weight-on-bit rather than the voltage across the strain gauge), or compressed representations of the data.

A telemetry system 208 conveys at least some of the measured parameters to a processing system 210 at the surface, the uphole system 210 collecting, recording, and processing the measured parameters from downhole as well as from a set of sensors 212 on and around the rig. Processing system 210 may display the recorded and processed parameters in log form on an interactive user interface 214. The processing system 210 may further accept user inputs and commands and operate in response to such inputs to, e.g., transmit commands and configuration information via telemetry system 208 to the downhole processor 206. Such commands may alter the operation of the downhole tool, e.g., adjusting power to selected components to reduce power dissipation or to adjust fluid flows for cooling.

Though the various parameters operated on by the uphole processing system represent different characteristics of the formation and the drilling operation, it should be recognized that they are not, strictly speaking, linearly independent. For example, the temperature measured by downhole tools may correlate with: the deployed length of the drill string (pursuant to the geothermal gradient); with the rotation rate, hook load, and torque (pursuant to frictional work); and with the rate of penetration and fluid flow rates (pursuant to heat transfer phenomena). Additional correlations with other parameters, whether attributable to known or unknown causes, may be sought and exploited. Particularly when combined with geothermal trends or more sophisticated engineering models for predicting temperature dependence along the desired borehole trajectory, the information derivable from such correlations with uphole drilling parameters is expected to be sufficient for accurate, real-time tracking of downhole temperature.

Consider FIG. 3, which is a graph of an illustrative drilling position as a function of time. This parameter may be measured uphole as a deployed length of the drill string, but may also or alternatively be based on parameters measured by the navigation instruments incorporated in the BHA and transmitted to the uphole processing system 126, 210. (Though not apparent on this scale, there are periodic pauses for the addition of new stands to extend the drill string.) At any given depth, the temperature profile for the fluids in the borehole can be simulated or modeled analytically.

Figure 5:
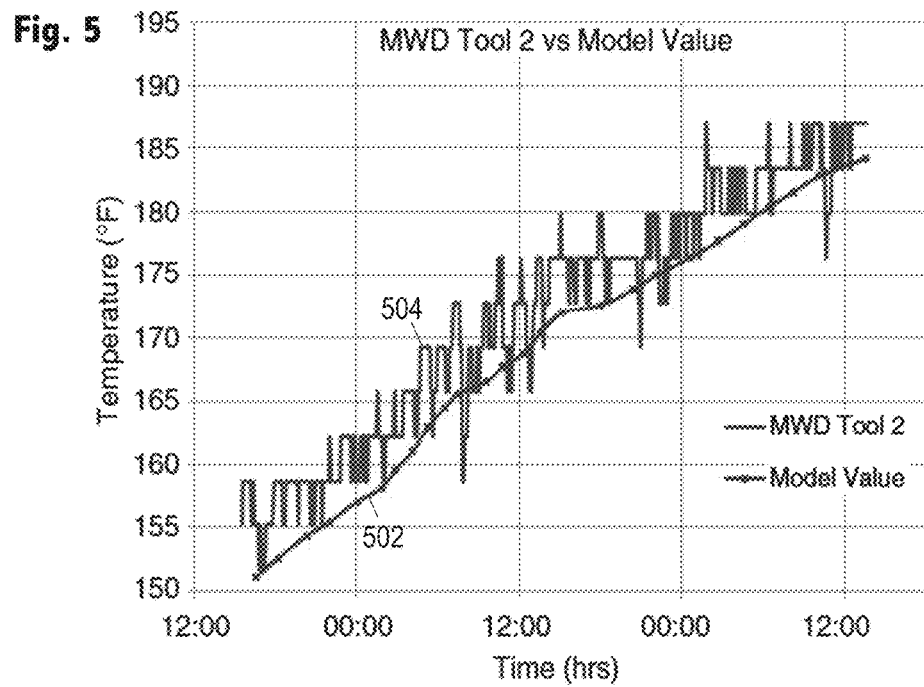
FIG. 5 is a graph comparing an estimated and a measured dependence of tool temperature on time.

FIG. 4 shows an example of the modeled temperature profile with the drill string at the final position in FIG. 3. Curve 402 shows the geothermal gradient of the formation. Due to the flowing fluid, however, the temperature profile in the borehole deviates from this geothermal gradient. Curves 404 and 406 respectively show the temperature profile for the fluid in the drillstring and the fluid in the annulus, pursuant to the model analysis laid out by Kumar and Samuel, "Analytical Model to Predict the Effect of Pipe Friction on Downhole Fluid Temperatures", SPE 165934, Drilling & Completion, September 2013. Based on the measured position (FIG. 3) and given flow rate, the modeled BHA temperature as a function of time is shown as curve 502 in FIG. 5. For comparison, the measured BHA temperature is shown as curve 504. Though some of the error is due to quantization effects, most of it is attributable to other phenomena that are expected to correlate with other measured parameters, e.g., rotation rate, torque, measured flow, ROP, each of which may represent pauses in drilling activity and excess friction during drilling.

Figure 6:
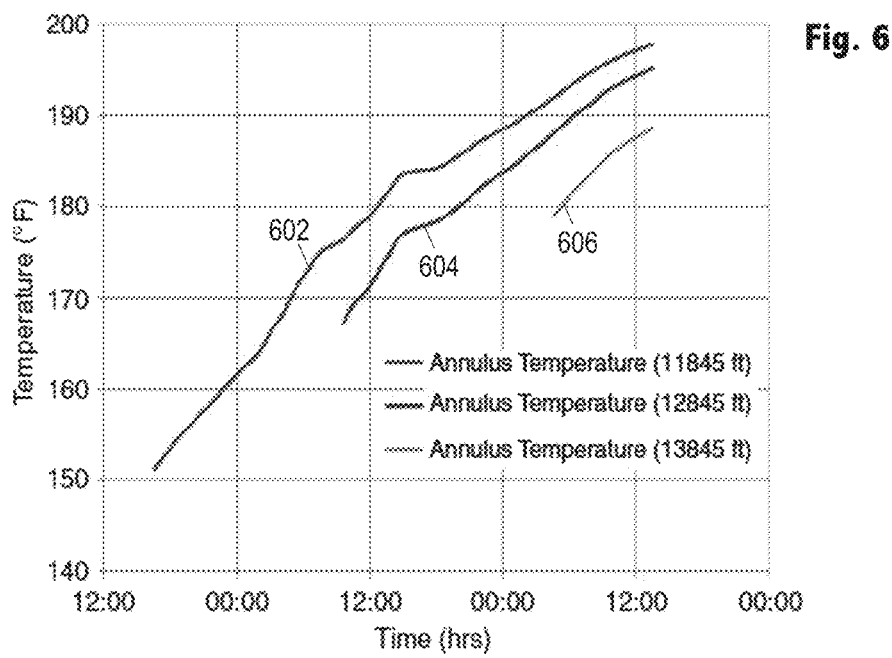
FIG. 6 is a graph showing time dependence of temperature at different positions in the borehole.

FIG. 6 presents the modeled annular temperatures as a function of time at multiple positions along the borehole, with curves 602, 604, and 606 corresponding to depths of 11845 ft, 12845 ft, and 13845 ft, respectively. Thus, additional input attributes for predicting the bottom-hole temperature may include measurements of temperature at fixed positions along the borehole, which may be available from casing-mounted tools and sensors.

Figure 7:
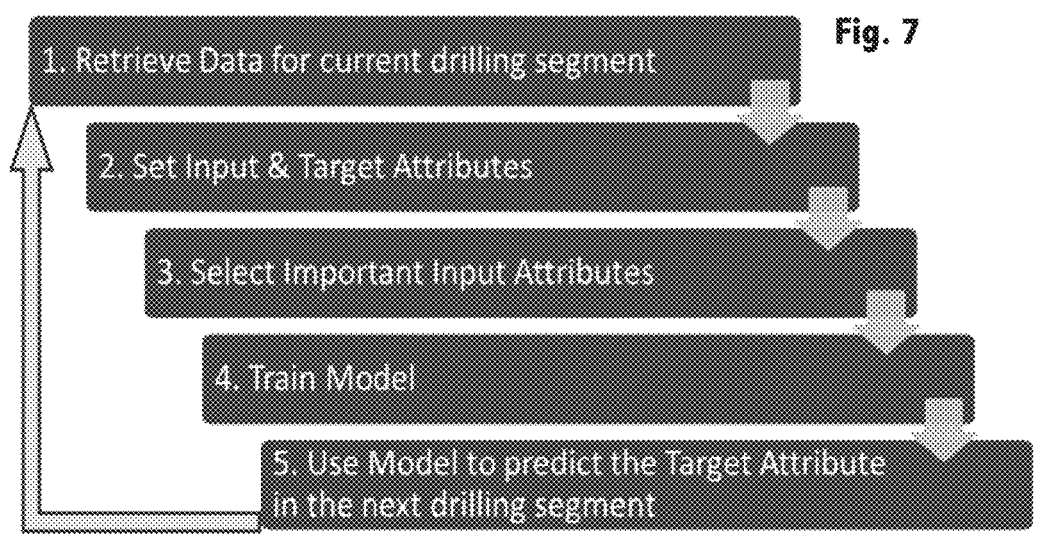
FIG. 7 is a flow diagram for a first illustrative logging method embodiment.

Based on the foregoing principles and observations, FIG. 7 presents a flow diagram of a first illustrative logging method which may be implemented by the surface interface 126 or the uphole processing unit 128, 210. In block 1, the system collects the input and target risk attributes for a current segment of the drilling process. In at least some embodiments, the input and target risk attributes for each segment are structured and accumulated as provided in FIG. 8 (each entry in the illustrated table represents a vector of attribute values acquired for the specified drilling segment). In block 2, the system sets the input and target risk attributes for a predictive model that is to be trained for estimating target risk attribute values of a subsequent segment of the drilling process in real time based on input attributes for that segment. Not all of the available input attributes may be needed, and accordingly in block 3, the system selects the important input attributes, i.e., those attributes that yield the best performance at estimating target risk attribute values. In block 4, the system trains the predictive model ("predictor"), which may take the form of a regression model, using the important selected input attributes and the available target risk attributes for the current segment. In block 5, the system uses the trained predictive model to predict the target risk attributes in real-time during the next segment. The target risk attribute(s) are expected to be available with much greater latency, much reduced frequency, and/or significantly reduced reliability than the input attributes. Accordingly, the regression model trained on input and target risk attributes of the current segment is used (real-time) during the drilling operation of the next drilling segment to estimate the target risk attribute.

FIG. 9 presents a second illustrative logging method which may be implemented by the surface interface 126, or the uphole processing unit 128, 210. In block 702, the system accepts user input to set the target risk attribute(s), i.e., the one or more parameters that are to be predicted based on their correlations with other parameters. The system further accepts user input to identify the set of available input attributes from which the target risk attributes are to be determined. As an alternative to user specification of input attributes, the system automatically scan the available interfaces to identify all available and/or suitable parameters being sensed and available for collection. Such parameters are expected to include at least one uphole drilling parameter, but may further include any downhole parameters that are being communicated to the surface in near-real time.

In block 704, the system collects the input and target risk attributes during a current segment of the drilling process. The target risk attribute(s) are expected to be available with much greater latency, much reduced frequency, and/or significantly reduced reliability than the input attributes. Once the target risk attribute(s) for the current segment become available, the predictive model(s) for the next segment are trained in block 706. (For the first segment, the predictor may be based on data obtained in another well. Alternatively, a generic model may be employed or the predictive operation omitted for the first segment. Many target risk attributes would not be expected to approach their critical values in the early stages of the drilling process.) Also, during the drilling process for the current segment, the system applies the one or more predictive models (also termed "predictors") from the previous segment to the input attributes to generate a real-time estimate of the target risk attribute(s) for the current segment in block 708.

Various techniques for training a predictor are known in the literature and are suitable for use in block 708 (and in block 4 of FIG. 7). In their various ways, such techniques extract the useful correlations between the input attributes and the target risk attributes and embody them in a model that extrapolates from new input attribute values to predict target risk attribute values. See, e.g., the literature on adaptive filtering, system identification, neural networks, pattern identification, and principle component analysis. Such literature further includes suitable techniques for selecting a proper model complexity and an optimal subset of input attributes from the available input attributes. Specifically contemplated techniques include the use of support vector machines, radial basis neural networks, and regression trees. Various numbers and combinations of input attributes may be evaluated on the basis of their root mean square error (RMSE) predictive performances, with a built-in complexity-based penalty to prevent over-fitting the data.

The predictor may be trained based only on the attributes for the current segment of the drilling process ("individual mode"), or may be trained in a cumulative fashion based on the data from all the preceding segments as well ("cumulative mode"). In some contemplated embodiments, multiple predictors are trained (e.g., using both individual and cumulative modes for different subsets of input attributes) and an optimal predictor is selected. In some further contemplated embodiments, the outputs of multiple models may be combined to predict the desired target risk attributes in an ensemble modeling mode.

Blocks 710, 712, and 714 represent optional uses for the target risk attribute predictions. In block 710, the target risk attribute predictions are used to validate the measured target risk attributes as they become available, with large deviations being potentially indicative of sensor degradation or abnormal tool conditions. In block 712, the predicted target risk attributes are displayed as a real-time log to enable the operator to track (at least in estimated form) the target risk attribute. In block 714, the system may automatically, or at the operator's direction, adjust the drilling process based on the target risk attribute predictions. For example, the flow rates, RPM, torque limits, and/or hook load may be adjusted as needed to maintain the tool temperature within a desired range. As another example, if the operation conditions of the bottom-hole assembly have departed from an acceptable range, the BHA may be tripped from the hole for evaluation and possible reconfiguration.

In block 716, the system determines whether the drilling process is continuing into the next segment, in which case blocks 704-716 may be repeated with the next segment taken as the current segment. Segment selection may be arbitrary, e.g., each segment being 1000 ft long, or each segment being defined by pauses in the drilling process (e.g., for determining waypoints), but should at least be of adequate size to assure adequate training of the predictive model(s).

Embodiments disclosed herein include:

A: A method that comprises obtaining input attribute values and a target risk attribute value associated with a first borehole segment, training a prediction model for the target risk attribute using the input attribute values and the target risk attribute value, acquiring subsequent input attribute values, using the trained prediction model and the subsequent input attribute values to predict a target risk attribute value for a second borehole segment, and storing or displaying information based on the predicted target risk attribute value.

B: A system that comprises at least one processor and a memory in communication with the at least one processor. The memory stores instructions that, when executed, cause the at least one processor to: obtain input attribute values and a target risk attribute value associated with a first borehole segment, train a prediction model for the target risk attribute using the first set of input attributes and the target risk attribute value, acquire subsequent input attribute values, use the trained prediction model and the subsequent input attribute values to predict a target risk attribute value for a second borehole segment, and store or display information based on the predicted target risk attribute value.

Each of the embodiments, A and B, may have one or more of the following additional elements in any combination. Element 1: the target risk attribute corresponds to temperature variation. Element 2: the input attribute comprises a drilling fluid temperature at earth's surface. Element 3: the input attribute comprises a downhole drilling fluid temperature. Element 4: the input attribute comprises a standpipe pressure or drilling fluid flow rate. Element 5: the input attribute comprises measured formation parameters. Element 6: the input attribute comprises a drilling friction estimate calculated as a function of one or more drilling parameters selected from the list consisting of weight-on-bit, torque, rotation speed, and rate of penetration. Element 7: further comprising comparing the predicted target risk attribute value to a predetermined threshold, and displaying a sensor risk warning based on the comparison. Element 8: further comprising comparing the predicted target risk attribute value to a predetermined threshold, and displaying a drilling risk warning based on the comparison. Element 9: further comprising adjusting a drilling direction based on the predicted target risk attribute value. Element 10: further comprising adjusting a drilling operational parameter based on the predicted target risk attribute value. Element 11: further comprising a first borehole segment corresponding to a different borehole, and wherein the second borehole segment corresponds to a current borehole segment or ahead-of-bit segment of a borehole being drilled. Element 12: further comprising a first borehole segment corresponding to a previous borehole segment of a borehole being drilled and the second borehole segment corresponds to a current borehole segment or ahead-of-bit segment of the borehole being drilled.

Element 13: the target risk attribute is temperature variation. Element 14: the input attribute comprises a measurable parameter sensed by at least one sensor associated with a borehole being drilled. Element 15: the instructions further cause the at least one processor to identify when a predicted downhole target attribute value exceeds a predetermined threshold and to display a related message on a monitor. Element 16: the at least one processor outputs a control signal to adjust a drilling direction or drilling parameter based on the predicted target risk attribute value. Element 17: further comprising a bottom-hole assembly (BHA) with a drill bit and at least one BHA sensor, wherein the at least one BHA sensor obtains at least some of the subsequent input attribute values while a borehole is being drilled by the drill bit. Element 18: further comprising a bottom-hole assembly (BHA) with a drill bit and at least one BHA sensor, wherein the at least one BHA sensor obtains the target risk attribute value while a borehole is being drilled by the drill bit.

Numerous variations and modifications will become apparent to those skilled in the art once the above disclosure is fully appreciated. It is intended that the following claims be interpreted to embrace all such variations and modifications where applicable.

What is claimed is:

1. A method for preventing damage to a downhole borehole assembly (BHA) portion of a drilling system being used to drill a second borehole segment after a first borehole segment has been drilled that comprises:
    obtaining input attribute values and a target risk attribute value associated with a first borehole segment, wherein:
        the input attribute values are data from sensors in a drilling system used to drill the first borehole segment,
        the input attribute values are correlated with the target risk attribute value, and
        the target risk attribute value is a value of a downhole attribute that is correlated with an increased risk of downhole sensor degradation or failure;
    training a prediction model for the target risk attribute using the input attribute values and the target risk attribute value by identifying correlations between the input attribute values and the target risk attributes and embodying the correlations in the prediction model that extrapolates from new input attribute values to predict target risk attribute values;
    acquiring subsequent input attribute values from the drilling system being used to drill the second borehole segment;
    using the trained prediction model and the subsequent input attribute values to predict a target risk attribute value for a second borehole segment, wherein:
        the predicted target risk attribute value is a value of a downhole attribute that is correlated with an increased risk of degradation or failure of a sensor in the BHA being used to drill the second borehole segment; and
    determining based on the predicted target risk attribute value that the sensor in the BHA being used to drill the second borehole segment is at risk of degradation or failure and removing the BHA from the borehole and evaluating the sensor in the BHA for degradation or failure.

2. The method of claim 1, wherein the target risk attribute corresponds to temperature variation.

3. The method of claim 1, wherein the input attribute comprises a drilling fluid temperature at earth's surface.

4. The method of claim 1, wherein the input attribute comprises a downhole drilling fluid temperature.

5. The method of claim 1, wherein the input attribute comprises a standpipe pressure or drilling fluid flow rate.

6. The method of claim 1, wherein the input attribute comprises measured formation parameters.

7. The method of claim 1, wherein the input attribute comprises a drilling friction estimate calculated as a function of one or more drilling parameters selected from the list consisting of weight-on-bit, torque, rotation speed, and rate of penetration.

8. The method of claim 1, further comprising comparing the predicted target risk attribute value to a predetermined threshold, and displaying a sensor risk warning based on the comparison.

9. The method of claim 1, further comprising comparing the predicted target risk attribute value to a predetermined threshold, and displaying a drilling risk warning based on the comparison.

10. The method of claim 1, further comprising adjusting a drilling direction based on the predicted target risk attribute value.

11. The method of claim 1, further comprising adjusting a drilling operational parameter based on the predicted target risk attribute value.

12. The method of claim 1, wherein the first borehole segment corresponds to a different borehole, and wherein the second borehole segment corresponds to a current borehole segment or ahead-of-bit segment of a borehole being drilled.

13. The method of claim 1, wherein the first borehole segment corresponds a previous borehole segment of a borehole being drilled and the second borehole segment corresponds to a current borehole segment or ahead-of-bit segment of the borehole being drilled.

14. A system that comprises:
    at least one processor;
    a memory in communication with the at least one processor processing and storing instructions that, when executed, causes the at least one processor to:
        obtain input attribute values and a target risk attribute value associated with a first borehole segment, wherein:
            the input attribute values are data from sensors in a drilling system used to drill the first borehole segment,
            the input attribute values are correlated with the target risk attribute value, and
            the target risk attribute value is a value of a downhole attribute that is correlated with an increased risk of downhole sensor degradation or failure;
        train a prediction model for the target risk attribute using the first set of input attributes and the target risk attribute value by identifying correlations between the input attribute values and the target risk attributes and embodying the correlations in the prediction model that extrapolates from new input attribute values to predict target risk attribute values;
        acquire subsequent input attribute values from a drilling system being used to drill a second borehole segment;
        use the trained prediction model and the subsequent input attribute values to predict a target risk attribute value for a second borehole segment, wherein:

the predicted target risk attribute value is a value of a downhole attribute that is correlated with an increased risk of degradation or failure of a sensor in the BHA being used to drill the second borehole segment; and determine based on the predicted target risk attribute value that the sensor in the BHA being used to drill the second borehole segment is at risk of degradation or failure and cause the BHA to be removed from the borehole and cause the sensor in the BHA to be evaluated for degradation or failure.

15. The system of claim 14, wherein the target risk attribute is temperature variation.

16. The system of claim 14, wherein the input attribute comprises a measurable parameter sensed by at least one sensor associated with a borehole being drilled.

17. The system of claim 14, wherein the instructions further cause the at least one processor to identify when a predicted downhole target attribute value exceeds a predetermined threshold and to display a related message on a monitor.

18. The system of claim 14, wherein the at least one processor outputs a control signal to adjust a drilling direction or drilling parameter based on the predicted target risk attribute value.

19. The system of claim 14, further comprising a bottom-hole assembly (BHA) with a drill bit and at least one BHA sensor, wherein the at least one BHA sensor obtains at least some of the subsequent input attribute values while a borehole is being drilled by the drill bit.

20. The system of claim 14, further comprising a bottom-hole assembly (BHA) with a drill bit and at least one BHA sensor, wherein the at least one BHA sensor obtains the target risk attribute value while a borehole is being drilled by the drill bit.

* * * * *